US011979712B2

(12) United States Patent
Qian et al.

(10) Patent No.: US 11,979,712 B2
(45) Date of Patent: May 7, 2024

(54) EXTENSION STRUCTURES IN PIEZOELECTRIC MICROELECTROMECHANICAL SYSTEM MICROPHONES

(71) Applicant: SKYWORKS SOLUTIONS, INC., Irvine, CA (US)

(72) Inventors: You Qian, Singapore (SG); Rakesh Kumar, Singapore (SG); Guofeng Chen, Fremont, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 188 days.

(21) Appl. No.: 17/810,359

(22) Filed: Jul. 1, 2022

(65) Prior Publication Data

US 2023/0007405 A1 Jan. 5, 2023

Related U.S. Application Data

(60) Provisional application No. 63/217,431, filed on Jul. 1, 2021.

(51) Int. Cl.
*H04R 17/02* (2006.01)

(52) U.S. Cl.
CPC ....... *H04R 17/02* (2013.01); *H04R 2201/003* (2013.01)

(58) Field of Classification Search
CPC ... H04R 17/02; H04R 2201/003; H04R 31/00
See application file for complete search history.

(56) References Cited

U.S. PATENT DOCUMENTS 9,055,372 B2 * 6/2015 Grosh .................... H04R 17/02
10,964,880 B2 3/2021 Grosh et al.

(Continued)

FOREIGN PATENT DOCUMENTS

EP 3557881 A1 10/2019
JP 2008118639 A 5/2008
JP 2019140638 A 8/2019

OTHER PUBLICATIONS

Chen et al. "Acoustic Transducers Built on Edge-released MEMS Structures," Solid-State Sensors, Actuators, and Microsystems Workshop Hilton Head Island, South Carolina, Jun. 6-10, 2010, pp. 234-237.

(Continued)

*Primary Examiner* — Brian Ensey
(74) *Attorney, Agent, or Firm* — Lando & Anastasi, LLP

(57) ABSTRACT

A piezoelectric microelectromechanical system microphone comprises a frame, a film of piezoelectric material including slits defining a plurality of independently displaceable piezoelectric elements within an area defined by a perimeter of the frame, bases of the plurality of piezoelectric elements mechanically secured to the frame, tips of the plurality of piezoelectric elements being free to be displaced in a direction perpendicular to a plane defined by the frame responsive to impingement of sound waves on the plurality of piezoelectric elements, and edge extensions extending from edges of the plurality of piezoelectric elements in the direction perpendicular to the plane defined by the frame to reduce a 3 dB roll-off frequency of the piezoelectric microelectromechanical system microphone.

20 Claims, 15 Drawing Sheets

(56) References Cited

U.S. PATENT DOCUMENTS

| | | | |
|---|---|---|---|
| 2016/0219375 A1 | | 7/2016 | Hall et al. |
| 2019/0281393 A1 | | 9/2019 | Grosh et al. |
| 2019/0327562 A1 | * | 10/2019 | Cerini .................. H10N 30/302 |
| 2020/0148532 A1 | | 5/2020 | Grosh et al. |
| 2020/0351595 A1 | | 11/2020 | Rusconi Clerici Beltrami et al. |
| 2020/0382876 A1 | | 12/2020 | Cerini et al. |
| 2021/0051413 A1 | | 2/2021 | Hui et al. |
| 2021/0084423 A1 | | 3/2021 | Rusconi Clerici Beltrami et al. |
| 2021/0120346 A1 | | 4/2021 | Hui et al. |
| 2021/0136483 A1 | | 5/2021 | Hsieh et al. |
| 2022/0073342 A1 | * | 3/2022 | Ho ........................ B81B 3/0021 |
| 2022/0267141 A1 | | 8/2022 | Chen et al. |
| 2022/0272459 A1 | | 8/2022 | Chen et al. |
| 2022/0332568 A1 | | 10/2022 | Barsukou |
| 2023/0011561 A1 | | 1/2023 | Qian et al. |
| 2023/0012046 A1 | | 1/2023 | Qian et al. |
| 2023/0039743 A1 | | 2/2023 | Hui et al. |
| 2023/0072672 A1 | | 3/2023 | Chen et al. |
| 2023/0104257 A1 | | 4/2023 | Barsukou et al. |
| 2023/0105699 A1 | | 4/2023 | Chen et al. |
| 2023/0127983 A1 | | 4/2023 | Chen et al. |
| 2023/0234837 A1 | | 7/2023 | Chen et al. |
| 2023/0239641 A1 | | 7/2023 | Chen et al. |
| 2023/0303387 A1 | | 9/2023 | Barsukou |

OTHER PUBLICATIONS

Chen et al., "Edge-released, piezoelectric MEMS acoustic transducers in array configuration," J. Micromech. Microeng. 22 (2012) 025005, pp. 1-9.

Huang et al., "High Sensitivity and High S/N Microphone Achieved by PZT Film with Central-Circle Electrode Design", IEEE, MEMS 2017, Las Vegas, NV, USA, Jan. 22-26, 2017, pp. 1188-1191.

Je et al., "In situ tuning of a MEMS microphone using electrodeposited nanostructures," Journal of Micromechanics and Microengineering, 19 (2009) 035015, pp. 1-8.

Je et al., "MEMS Capacitive Microphone with Dual-Anchored Membrane", Proceedings 2017, 1, 342; Aug. 9, 2017.

Knisely et al., "Method for Controlling Stress Gradients in PVD Aluminum Nitride", Journal of Micromechanics and Microengineering, vol. 28, No. 11, 2018.

Littrell, "High Performance Piezoelectric MEMS Microphones", A dissertation submitted in partial fulfillment of the requirements for the degree of Doctor of Philosophy (Mechanical Engineering) in the University of Michigan, 2010, 111 pages.

Lo et al., "Development of a No-Back-Plate SOI MEMS Condenser Microphone," IEEE, Transducers 2015, Anchorage, Alaska, Jun. 21-25, 2015, pp. 1085-1088.

Lo et al., "Sensitivity Improvement of No-Back-Plate MEMS Microphone Using Polysilicon Trench-refilled Process," IEEE, Transducers 2017, Kaohsiung, Taiwan, Jun. 18-22, 2017, pp. 1171-1174.

Mohamad et al., "Modelling and Optimisation of a Spring-Supported Diaphragm Capacitive MEMS Microphone", Engineering, 2010, 2, 762-770.

Peña-García et al., "Design and Modeling of a MEMS Dual-Backplate Capacitive Microphone with Spring-Supported Diaphragm for Mobile Device Applications," Sensors (2018), 18, 3545, 30 pages.

Segovia-Fernandez et al., "Monolithic Piezoelectric Aluminum Nitride MEMS-CMOS Microphone", IEEE (2017), Transducers 2017, Kaohsiung, Taiwan, Jun. 18-22, 2017, pp. 414-417.

Shah et al., "Design Approaches of MEMS Microphones for Enhanced Performance", Hindawi, Journal of Sensors, vol. 2019, Article ID 9294528, Mar. 6, 2019, 26 pages.

Udvardi et al., Spiral-Shaped Piezoelectric MEMS Cantilever Array for Fully Implantable Hearing Systems. Micromachines (2017) 8, 311, 13 pages.

Williams et al., "An AIN MEMS Piezoelectric Microphone for Aeroacoustic Applications", Journal of Microelectromechanical Systems, vol. 21, No. 2, Apr. 2012, pp. 270-283.

Yamashita et al., "Diaphragm deflection control of piezoelectric ultrasonic microsensors for sensitivity improvement", Sensors and Actuators A 139 (2007), pp. 118-123.

Yan et al., "Corrugated Diaphragm for Piezoelectric Microphone", IEEE, 1996, pp. 503-506.

Pulskamp et al. "Mitigation of residual film stress deformation in multilayer microelectromechanical systems cantilever devices." Journal of Vacuum Science & Technology B: Microelectronics and Nanometer Structures Processing, Measurement, and Phenomena 21.6 (2003): 2482-2486.

* cited by examiner

EXTENSION STRUCTURES IN PIEZOELECTRIC MICROELECTROMECHANICAL SYSTEM MICROPHONES

CROSS-REFERENCE TO RELATED APPLICATIONS

This application claims priority under 35 U.S.C. § 119(e) to U.S. Provisional Patent Application Ser. No. 63/217,431, titled "EXTENSION STRUCTURES IN PIEZOELECTRIC MICROELECTROMECHANICAL SYSTEM MICROPHONES," filed Jul. 1, 2021, the entire contents of which is incorporated herein by reference for all purposes.

BACKGROUND

Technical Field

Embodiments disclosed herein relate to piezoelectric microelectromechanical system microphones and to devices including same.

Description of Related Technology

A microelectromechanical system (MEMS) microphone is a micro-machined electromechanical device to convert sound pressure (e.g., voice) into an electrical signal (e.g., voltage). MEMS microphones are widely used in mobile devices such as cellular telephones, headsets, smart speakers, and other voice-interface devices/systems. Capacitive MEMS microphones and piezoelectric MEMS microphones (PMMs) are both available in the market. Piezoelectric MEMS microphones requires no bias voltage for operation, therefore, they provide lower power consumption than capacitive MEMS microphones. The single membrane structure of piezoelectric MEMS microphones enable them to generally provide more reliable performance than capacitive MEMS microphones in harsh environments. Existing piezoelectric MEMS microphones are typically based on either cantilever MEMS structures or diaphragm MEMS structures.

SUMMARY

In accordance with one aspect, there is provided a piezoelectric microelectromechanical system microphone. The piezoelectric microelectromechanical system microphone comprises a frame, a film of piezoelectric material including slits defining a plurality of independently displaceable piezoelectric elements within an area defined by a perimeter of the frame, bases of the plurality of piezoelectric elements mechanically secured to the frame, tips of the plurality of piezoelectric elements being free to be displaced in a direction perpendicular to a plane defined by the frame responsive to impingement of sound waves on the plurality of piezoelectric elements, and edge extensions extending from edges of the plurality of piezoelectric elements in the direction perpendicular to the plane defined by the frame to reduce a 3 dB roll-off frequency of the piezoelectric microelectromechanical system microphone.

In some embodiments, the plurality of piezoelectric elements have cantilever structures.

In some embodiments, the piezoelectric microelectromechanical system microphone has a 3 dB roll-off frequency of 100 Hz or less.

In some embodiments, at least one of the plurality of piezoelectric elements exhibits a static displacement from a plane defined by an upper surface of the frame.

In some embodiments, a first of the plurality of piezoelectric elements exhibits a first static deflection, and a second of the plurality of piezoelectric elements exhibits a second static deflection that is different from the first static deflection.

In some embodiments, the plurality of piezoelectric elements each include an upper film of piezoelectric material having a first average residual stress and a lower film of piezoelectric material having a second average residual stress different from the first average residual stress.

In some embodiments, the upper film of piezoelectric material has a stress distribution that at least partially cancels a stress distribution in the lower film of piezoelectric material.

In some embodiments, the plurality of piezoelectric elements exhibit substantially no static deflection.

In some embodiments, the edge extensions are present on only portions of the edges of each of the plurality of piezoelectric elements.

In some embodiments, the edge extensions are absent from portions of the edges of each of the plurality of piezoelectric elements in sensing regions proximate the frame.

In some embodiments, the sensing regions extend from the bases of the plurality of piezoelectric elements inward toward the tips of the plurality of piezoelectric elements.

In some embodiments, the sensing regions extend from the bases of the plurality of piezoelectric elements inward toward the tips of the plurality of piezoelectric elements by from 20% to 40% of lengths of the edges of the plurality of piezoelectric elements from the bases to the tips.

In some embodiments, the edge extensions are present within portions of the edges of each of the plurality of piezoelectric elements in mechanical regions extending from inward extents of the sensing regions to the tips of the plurality of piezoelectric elements.

In some embodiments, gaps between adjacent piezoelectric elements in the mechanical regions are narrower than gaps between adjacent piezoelectric elements in the sensing regions.

In some embodiments, the plurality of piezoelectric elements are substantially triangular.

In some embodiments, the edge extensions have lengths that are between 1 μm and 10 μm or between 0.2% and 5% of lengths of the edges of the piezoelectric elements.

In some embodiments, the edge extensions descend downward from edges of the piezoelectric elements at an angle relative to the direction perpendicular to the plane defined by the frame.

In some embodiments, the angle is between 30° and 85°.

In some embodiments, the plurality of piezoelectric elements and the edge extensions are formed of a same material.

In some embodiments, the piezoelectric microelectromechanical system microphone is included in an electronic device.

BRIEF DESCRIPTION OF THE DRAWINGS

Embodiments of this disclosure will now be described, by way of non-limiting example, with reference to the accompanying drawings.

DETAILED DESCRIPTION OF CERTAIN EMBODIMENTS

Figure 1A:
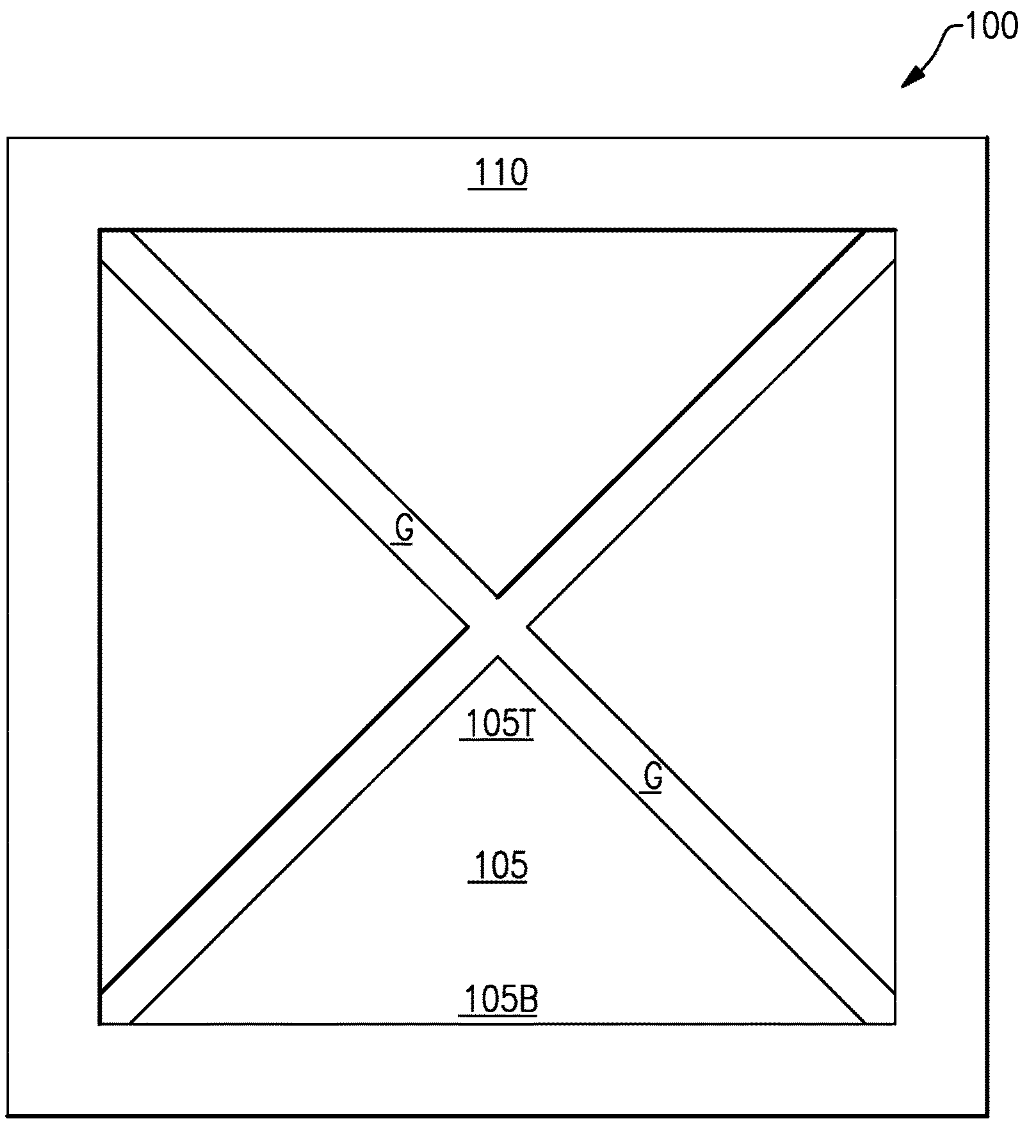
FIG. 1A is a plan view of an embodiment of a cantilever piezoelectric microelectromechanical microphone.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Microelectromechanical system (MEMS) microphones are typically produced using techniques similar to those for fabricating semiconductor devices on semiconductor wafers. The performance of MEMS microphones produced by a particular manufacturer or even within a single batch or from a single semiconductor wafer may vary due to process variations inherent in the manufacturing process for these microphones. One parameter that may differ across batches of MEMS microphones due to variations in the manufacturing process is residual stress within a piezoelectric film used as part of a sound-to-voltage transducer in the microphones. In some examples, the stress variation of a piezoelectric film, for example, a film of AlN, could be higher than 300 MPa across a single wafer due to limitations in uniformity of the AlN deposition process.

Figure 1B:
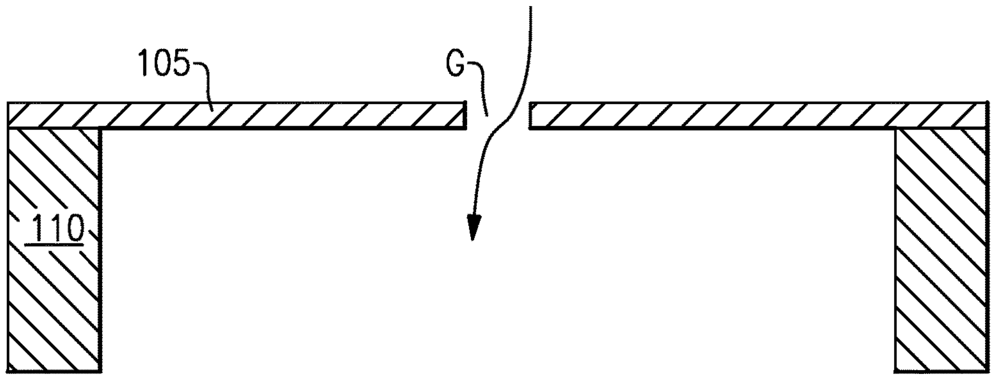
FIG. 1B is a cross-sectional view of the piezoelectric MEMS microphone of FIG. 1A.

One example of a cantilever type piezoelectric microelectromechanical system microphone is shown in a simplified plan view in FIG. 1A and in a simplified cross-sectional view in FIG. 1B. The cantilever piezoelectric MEMS microphone 100 includes several cantilevers 105 formed from a piezoelectric material, for example, aluminum nitride. The bases 105B of the cantilevers are secured to a frame 100 and the tips 105T of the cantilevers are free to move up and down in a direction perpendicular to a plane defined by the frame. Gaps G separate the cantilevers 105 from one another. Each cantilever 105 may be about 1 μm thick and the entire microphone may be about 1 mm across, although these dimensions are not intended to be limiting. Although illustrated as having a square frame and triangular piezoelectric cantilevers, in other embodiments a cantilever piezoelectric MEMS microphone may have a different shape, for example, a circular shaped frame with pie-piece shaped cantilevers. In accordance with some embodiments a piezoelectric MEMS microphone based on a cantilever structure that may include triangular, rectangular, or polygonal shaped cantilevers is clamped all around the edges of the piezoelectric MEMS microphone. The cantilever piezoelectric MEMS microphone includes one, two, or multiple piezoelectric layers.

Acoustic pressure from, for example, the voice of a user causes the piezoelectric cantilevers to deflect and generate a voltage that is sensed by electrodes (not shown) disposed on or within the cantilevers to provide a signal indicative of the voice of the user. As illustrated in FIG. 1B, the cantilevers 105 are preferably flat when not acted upon by a source of acoustic pressure and the gap between the cantilevers is small. A small gap between the cantilevers helps prevent sound waves from passing through the piezoelectric MEMS microphone without deflecting the cantilevers, thus providing for a sensitive piezoelectric MEMS microphone, especially at low frequencies.

Figure 2A:
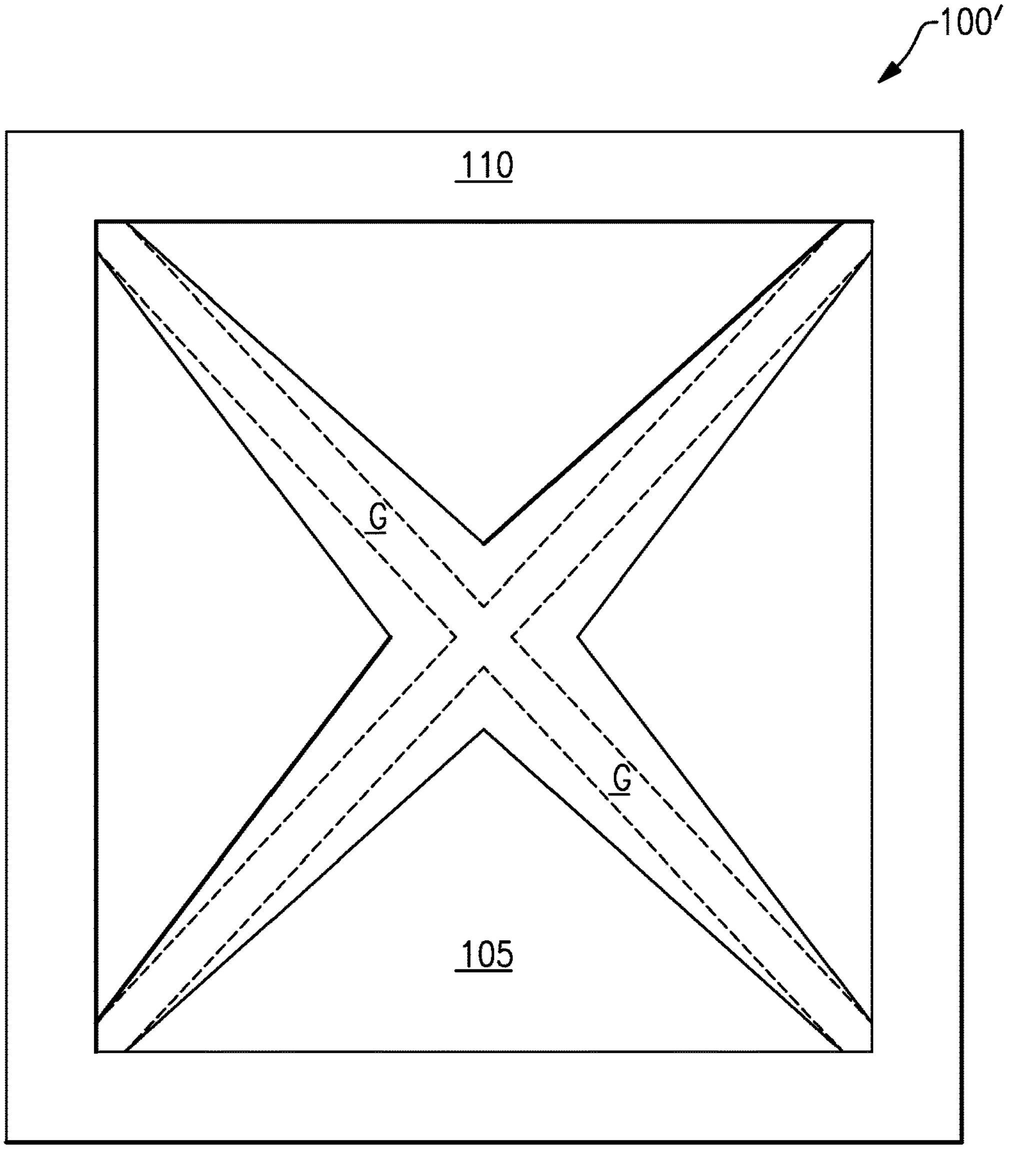
FIG. 2A is a plan view of another embodiment of a cantilever piezoelectric MEMS microphone.
Figure 2B:
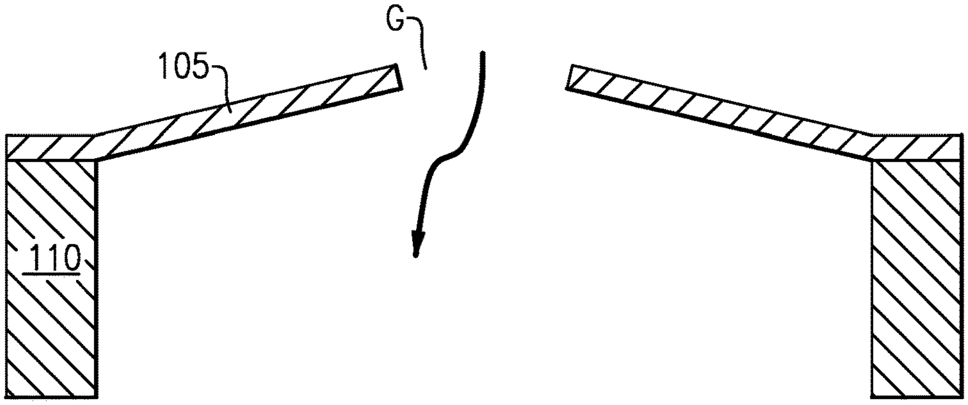
FIG. 2B is a cross-sectional view of the piezoelectric MEMS microphone of FIG. 2A.

In some embodiments residual stresses may remain within the cantilevers of a piezoelectric MEMS microphone due to, for example, process variations in the manufacturing process for the piezoelectric MEMS microphone. In some manufacturing processes for piezoelectric films used for cantilevers in piezoelectric MEMS microphones, variation across a single wafer may cause cantilevers formed from material from the same wafer to have differences in static deflection of, for example, 20 μm or more. A cantilever piezoelectric MEMS microphone 100' with residual stresses in the cantilevers may appear as shown in FIGS. 2A and 2B, where the residual stresses cause the cantilevers to exhibit static displacement wherein the cantilevers are bent from a flat orientation even in the absence of applied acoustic pressure. This increases the size of the gap between adjacent cantilevers and reduces the sensitivity of the piezoelectric MEMS microphone, especially at low frequencies. In some embodiments, piezoelectric cantilevers having lengths of about 200 μm that exhibit static deflection of about 16 μm at the tips may reduce the acoustic resistance of a piezoelectric MEMS microphone by about 90% as compared to a piezoelectric MEMS microphone that had flat cantilevers. The static deflection of the cantilevers may cause the 3 db roll-off point of the piezoelectric MEMS microphone, that defines the frequency at which sensitivity of microphone reduces by 3 dB of its sensitivity measured at a frequency of 1 KHz, to change from about 20 Hz to about 200 Hz.

Figure 3:
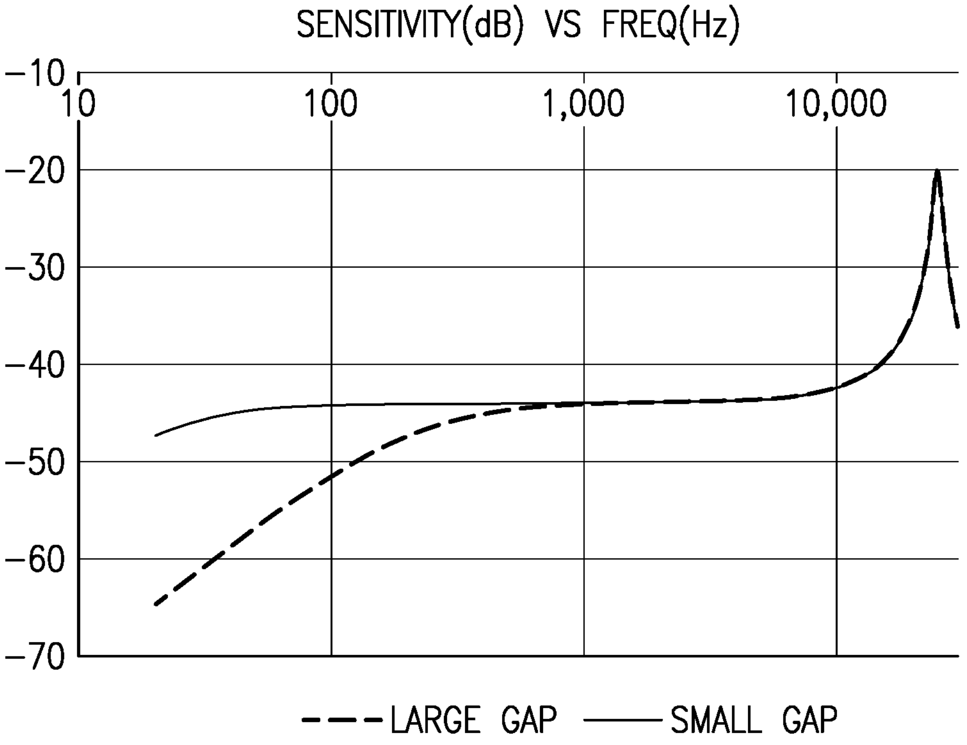
FIG. 3 is a chart illustrating the effect of size of gaps between adjacent cantilevers in a piezoelectric MEMS microphone on the sensitivity of the piezoelectric MEMS microphone.

FIG. 3 illustrates how the sensitivity of a cantilever piezoelectric MEMS microphone may change when there is a small gap versus a large gap between the cantilevers. FIG. 3 is intended to generally illustrate the effect on change in sensitivity of cantilever piezoelectric MEMS microphones with small versus large gaps between cantilevers due to residual stresses in the cantilevers, but is not meant to illustrate numerically accurate sensitivity levels for any particular piezoelectric MEMS microphone disclosed herein.

Cantilever piezoelectric MEMS microphones are generally free from sensitivity degradation due to residual stress resulting from manufacturing variation, but they suffer from poor low-frequency roll-off ($f_{-3dB}$) control as the gap between ends of opposing cantilevers enlarges when the cantilevers deflect due to the residual stress. A method to reduce the effects of cantilever static deflection is desired.

Figure 4A:
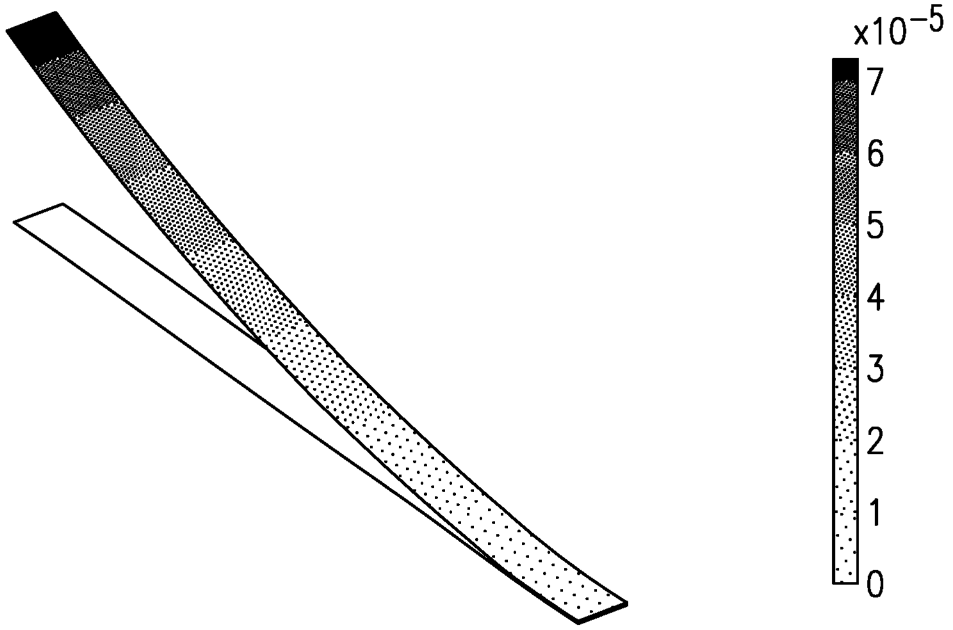
FIG. 4A illustrates an example of static displacement of a tip of a piezoelectric material cantilever due to average residual stress in the material of the cantilever.
Figure 4B:
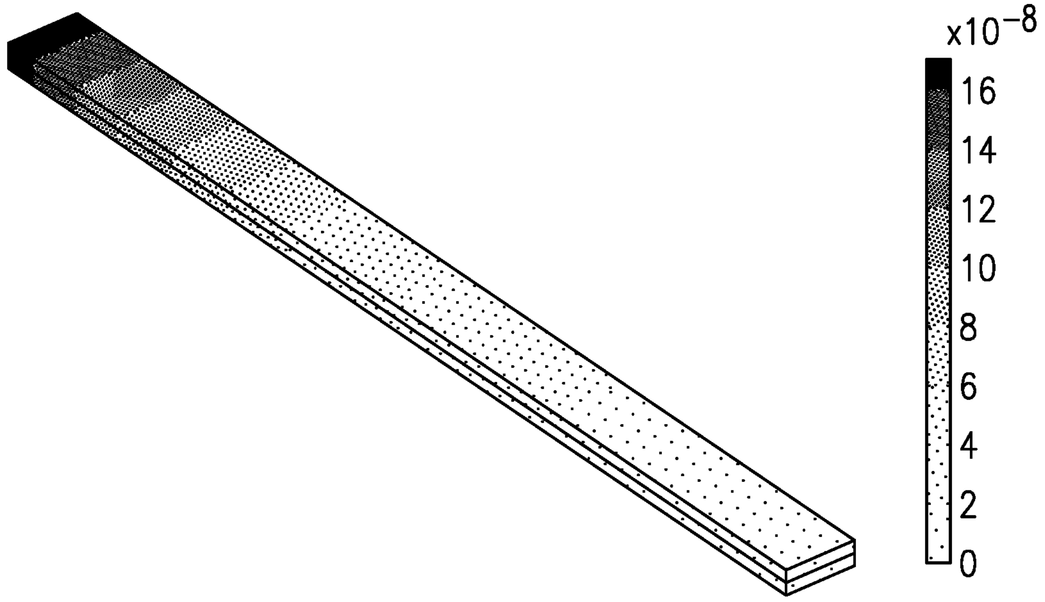
FIG. 4B illustrates how the tip displacement of the cantilever of FIG. 4A may be reduced by stacking a second piezoelectric material layer having a different average residual stress on the first piezoelectric material layer of the cantilever.

One method of reducing static deflection of piezoelectric cantilevers in cantilever piezoelectric MEMS microphones is to form the piezoelectric cantilevers from multiple, for example, two different films that have different residual stress levels. The different films are deposited one on another by thin film deposition so that the tendency of one of the films to deflect due to its residual stress is at least partially cancelled out by the tendency of the other film to deflect in the opposite direction due to its residual stress. FIGS. 4A and 4B illustrate the effect of this method. FIG. 4A illustrates results of a simulation of a 300 μm long cantilever formed of a piezoelectric material with an average residual stress of 300 MPa. The cantilever exhibits a static deflection at the tip of about 73 μm. FIG. 4B is a simulation of the same cantilever as in FIG. 4A, but with a second layer of piezoelectric material having an average residual stress of −125 MPa deposited on it. The static deflection is canceled out by the addition of the second layer of piezoelectric material.

One difficulty with this approach is that it may be difficult to identify or reliably produce different piezoelectric films with different residual stresses that can be deposited on one another for a desired compensation of the residual stress effect and to form piezoelectric cantilevers that exhibit little static deflection. In some manufacturing processes, the difference in residual stress in two piezoelectric films formed on a wafer may vary by, for example, 50 MPa (plus or minus 25 MPa) across a single wafer.

Figure 5:
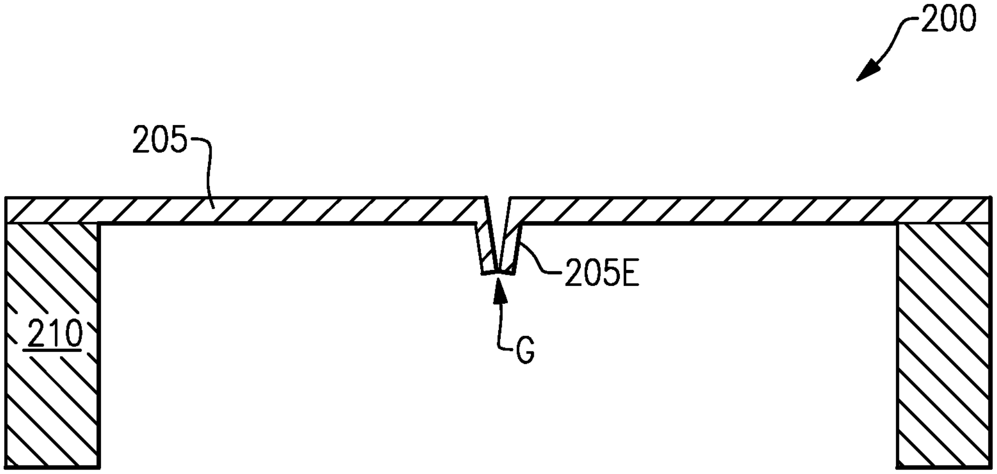
FIG. 5 is a cross-sectional view of a piezoelectric MEMS microphone having piezoelectric cantilevers including edge extensions.
Figure 6:
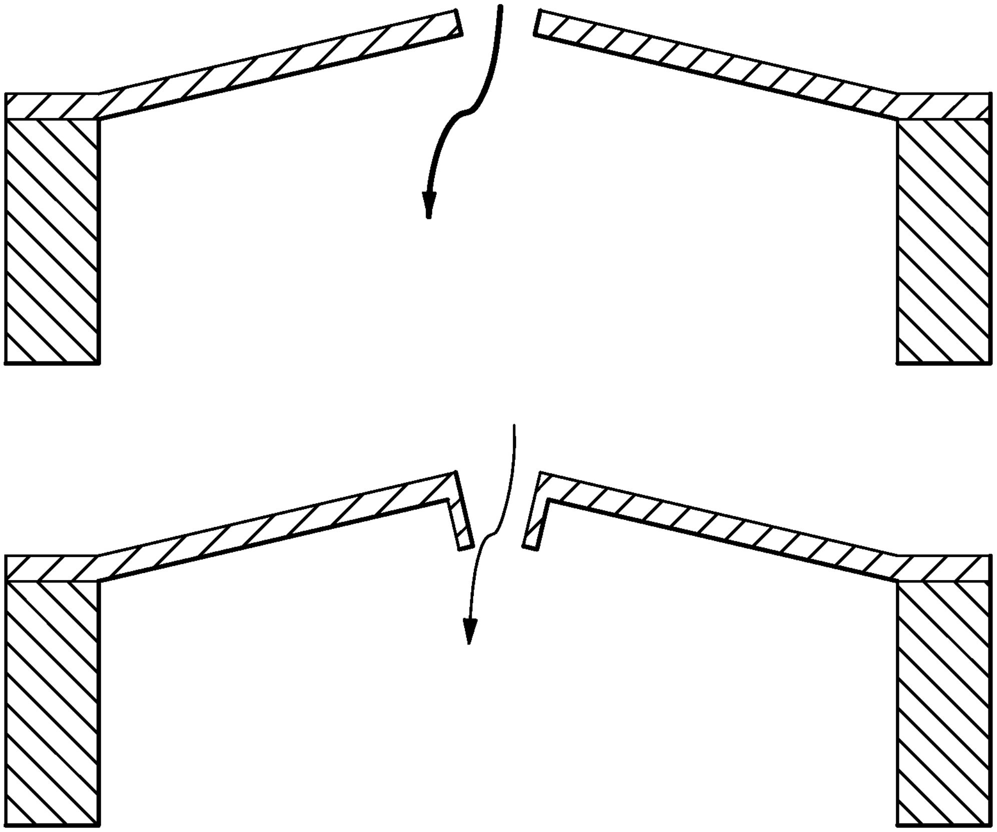
FIG. 6 illustrates the effect of the edge extensions illustrated in FIG. 5 on reducing the size of the gap between adjacent cantilevers when the cantilevers exhibit static deflection.
Figure 7:
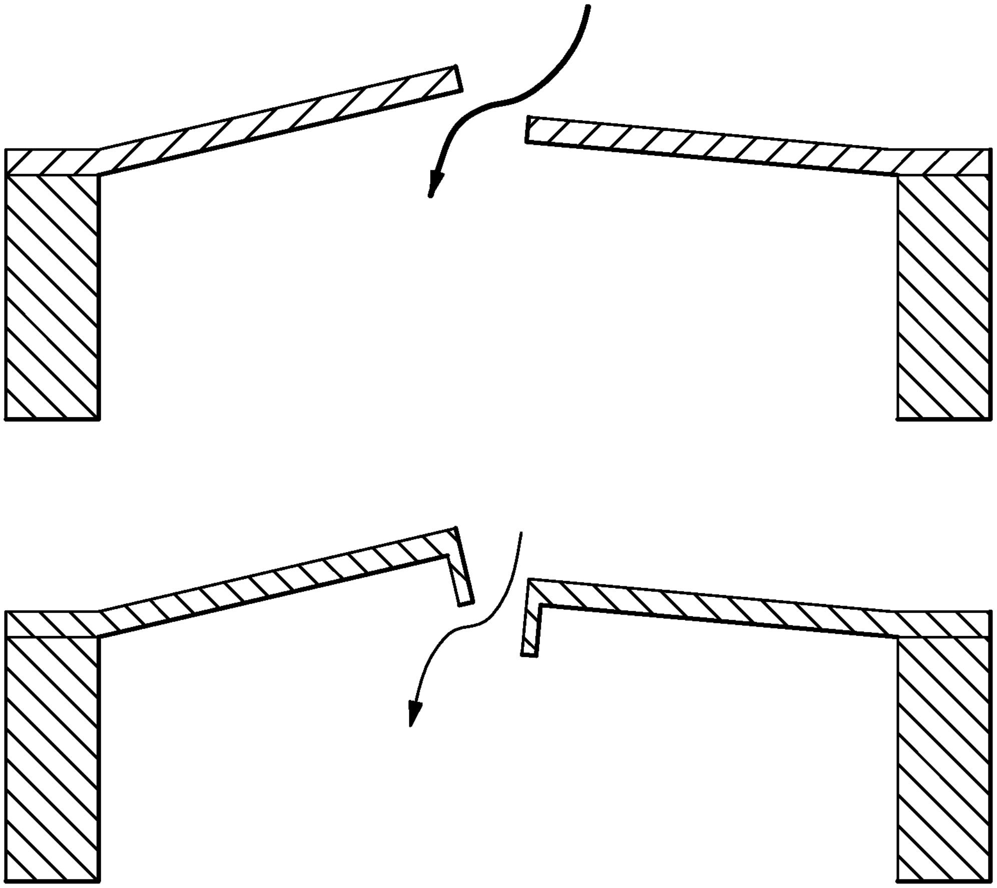
FIG. 7 illustrates the effect of the edge extensions illustrated in FIG. 5 on reducing the size of the gap between adjacent cantilevers when the cantilevers exhibit uneven static deflection.

In some embodiments, the effect of residual stress and static deformation in piezoelectric cantilevers on sensitivity of a piezoelectric MEMS microphone may be reduced by forming the piezoelectric cantilevers with edge extensions. FIG. 5 is a simplified cross-sectional diagram of a cantilever piezoelectric MEMS microphone 200 including cantilevers 205 with edge extensions 205E. The cantilevers of the cantilever piezoelectric MEMS microphone 200 is otherwise similar to that of the cantilever piezoelectric MEMS microphones 100, 100' discussed above, for example, having bases of the cantilevers on a frame 210. The edge extensions 205E extend downward from the tips of the cantilevers 205, in some embodiments at a slight angle from normal to the plane of the remainder of the cantilevers 205. In some embodiments, the edge extensions 205E may extend downward from the tips of the cantilevers 205 at an angle of from 30° to 85° or from 60° to 70° from the plane of the remainder of the cantilevers 205. In some embodiments, the edge extensions 205E may be from about 1 μm to about 10 μm in length or from about 2 μm to about 3 μm in length. The edge extensions 205E reduce the size of the gaps G between adjacent cantilevers and increase the sensitivity of the piezoelectric MEMS microphone. As illustrated in FIG. 6, in instances where the cantilevers 205 exhibit static deflection, the edge extensions reduce the size of the gap that would have been formed between edges of the cantilevers in the absence of the edge extensions and increases the acoustic impedance and sensitivity of the piezoelectric MEMS microphone. A similar improvement may be observed in a piezoelectric MEMS microphone in which the cantilevers exhibit different amounts of static deflection as illustrated in FIG. 7.

Figure 8:
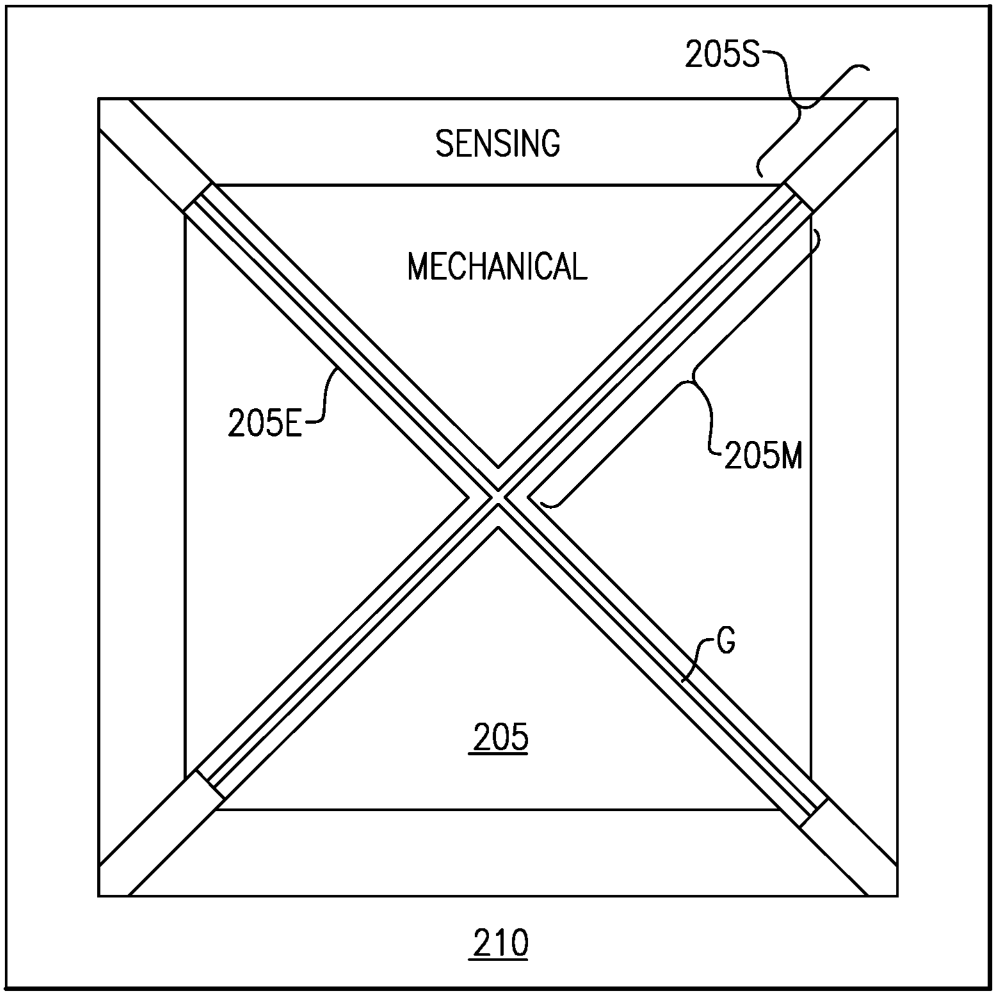
FIG. 8 is a plan view of another embodiment of a cantilever piezoelectric MEMS microphone.

In some embodiments, for example as illustrated in FIG. 8, the edge extensions 205E are present on portions, but not the entireties, of the edges of the piezoelectric cantilevers 205. The edge extensions 205E may be absent in sensing regions 205S of the edges of the piezoelectric cantilevers 205. In the sensing regions 205S near the bases of the piezoelectric cantilevers 205 near the frame 210, electrodes (not shown) of the piezoelectric MEMS microphone may be present. If the edge extensions 205E were present in the sensing regions 205S, they might reduce the amount of bending of the cantilevers 205 and reduce the intensity of signals generated by the piezoelectric material of the cantilevers 205 that could be read by the electrodes. The edge extensions 205E are desirably present on the edges of the cantilevers 205 in the mechanical regions 205M where displacement of the cantilevers in response to impinging acoustic energy is the largest. The sensing region 205S of the edges of the piezoelectric cantilevers 205 may extend from the frame 210 inward along the edges of the cantilevers 205 to about 20% to 40% of the length of the edges of the cantilevers 205. The mechanical regions 205M may extend from internal ends of the sensing regions 205S to the tips of the cantilevers 205 along the edges of the cantilevers 205.

Figure 9A:
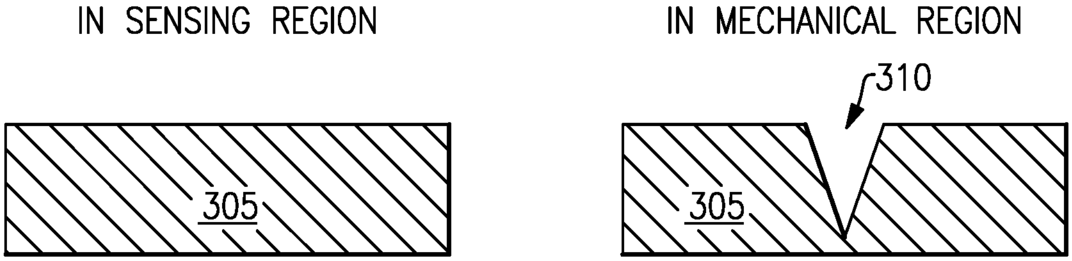
FIG. 9A illustrates an act in a process flow for producing an embodiment of a cantilever piezoelectric MEMS microphone.
Figure 9B:
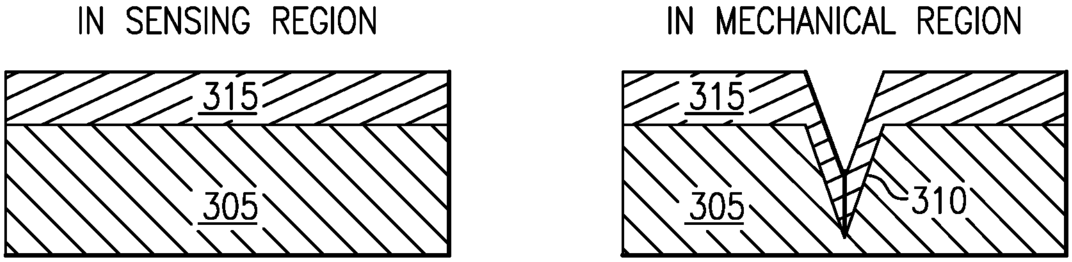
FIG. 9B illustrates another act in a process flow for producing an embodiment of a cantilever piezoelectric MEMS microphone.
Figure 9C:
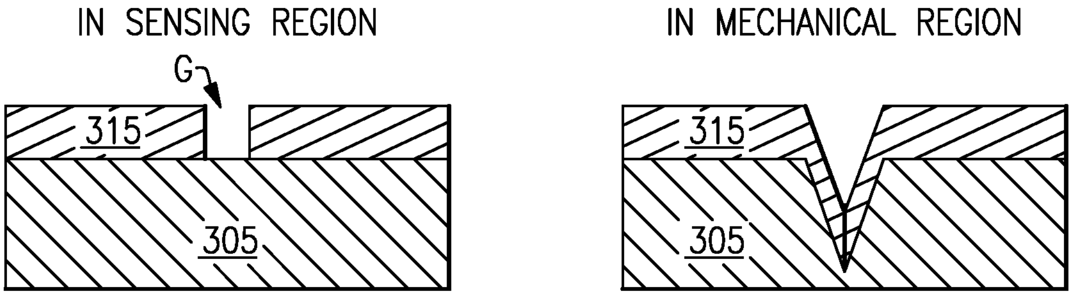
FIG. 9C illustrates another act in a process flow for producing an embodiment of a cantilever piezoelectric MEMS microphone.
Figure 9D:
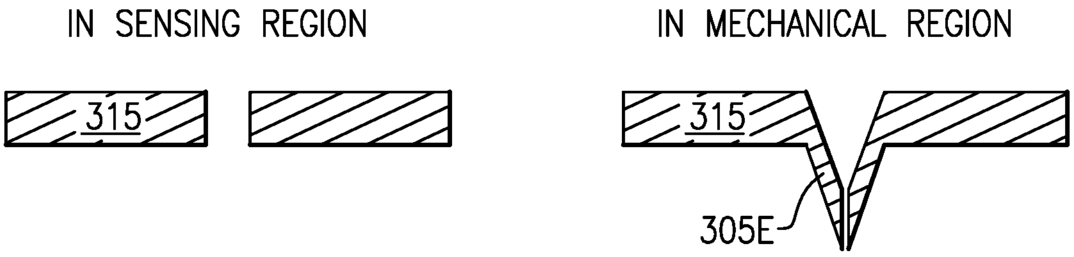
FIG. 9D illustrates another act in a process flow for producing an embodiment of a cantilever piezoelectric MEMS microphone.

The process flow for forming the cantilevers 205 may differ in the sensing regions 205S and in the mechanical regions 205M although it is to be understood that cantilevers 205 may be formed including these different regions in the same set of process steps. As illustrated in FIG. 9A, in areas of a substrate 305 in which the sensing regions 205S of the cantilevers 205 are to be formed, the substrate 305 is provided with a smooth flat upper surface. In areas of the substrate 305 in which the mechanical regions 205M of the cantilevers 205 are to be formed, the substrate 305 may be etched to include a trench 310. FIG. 9B illustrates an act of depositing piezoelectric material 315 on the different areas of the substrate 305. The piezoelectric material 315 forms a planar film on the areas of a substrate 305 in which the sensing regions 205S of the cantilevers 205 are to be formed. The piezoelectric material 315 follows the contour of the trench 310 in the areas of the substrate 305 in which the mechanical regions 205M of the cantilevers 205 are to be formed. FIG. 9C illustrates a further step in which gaps G are etched to form edges of the cantilevers in the areas of the substrate 305 in which the mechanical regions 205M of the cantilevers 205 are to be formed. No gap is etched in the piezoelectric material in the areas of the substrate 305 in which the mechanical regions 205M of the cantilevers 205 are to be formed. FIG. 9D illustrates that the piezoelectric material 315 is then released from the substrate 305, for example, by etching to free the cantilevers 205 from the substrate 305. As illustrated in FIG. 9D gaps between adjacent cantilevers 205 in the sensing regions 205S may be narrower than gaps between adjacent cantilevers 205 in the mechanical regions 205M.

Figure 10:
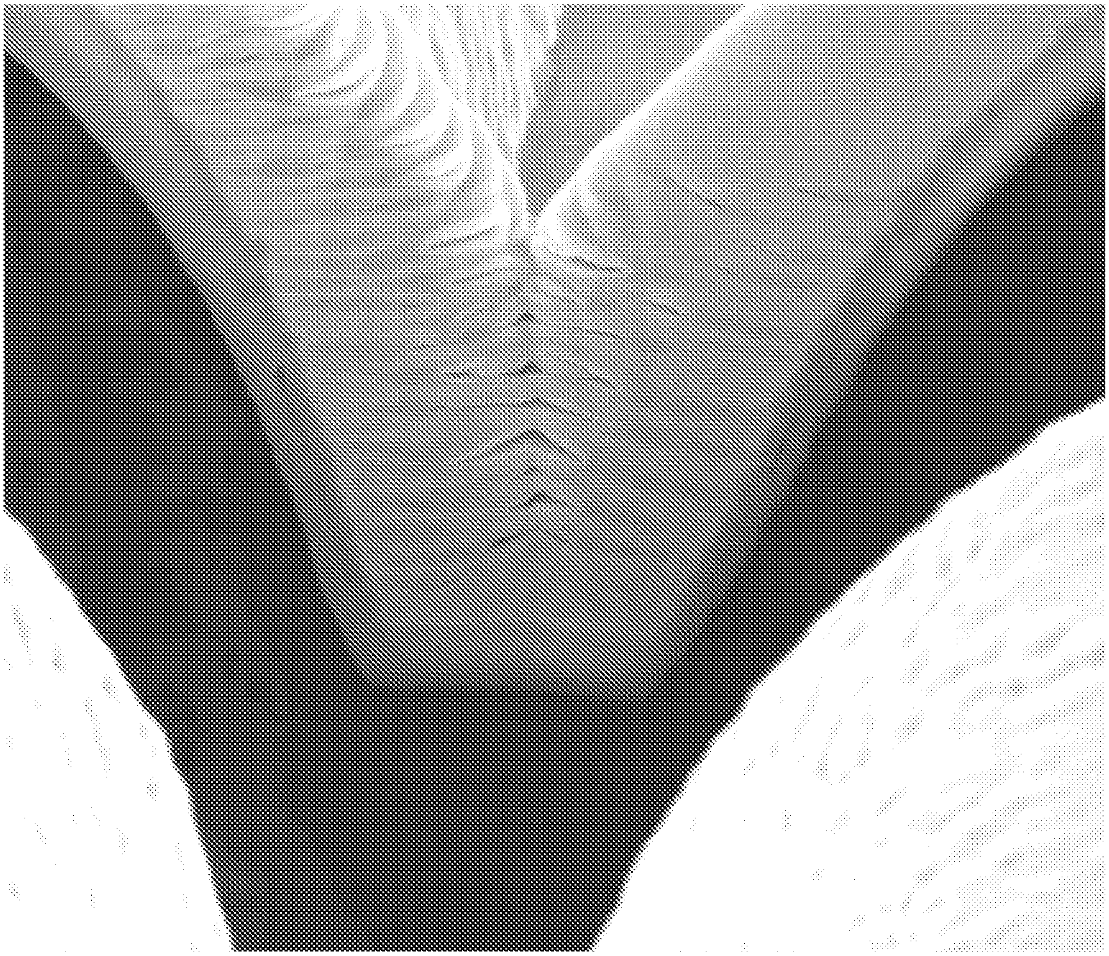
FIG. 10 is a micrograph of a portion of a piezoelectric film for an embodiment of a cantilever piezoelectric MEMS microphone at a point during formation of cantilevers from the piezoelectric film.

In some embodiments, due to defects present between the different edges of the piezoelectric material 315 in the trench 310, for example, due to crystallographic misalignment of the material at the bottom of the trench 310, the piezoelectric material 35 may crack and separate the edge extensions 205E from one another. FIG. 10 is a micrograph illustrating an example of piezoelectric material deposited in a trench. Defects in the form of microvoids can be observed extending upward through the material in a line from the center of the trench. If the piezoelectric material 315 deposited in the trench 310 does not crack during removal of the cantilevers 205 from the substrate, they would likely crack during later testing when acoustic pressure is applied to a cantilever piezoelectric MEMS microphone including the cantilevers 205.

Figure 9E:
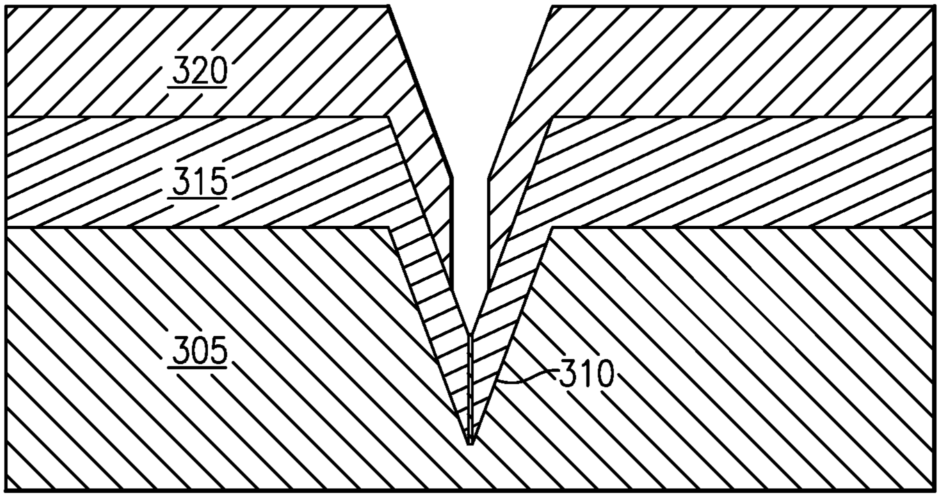
FIG. 9E illustrates another act in a process flow for producing an embodiment of a cantilever piezoelectric MEMS microphone.
Figure 9F:
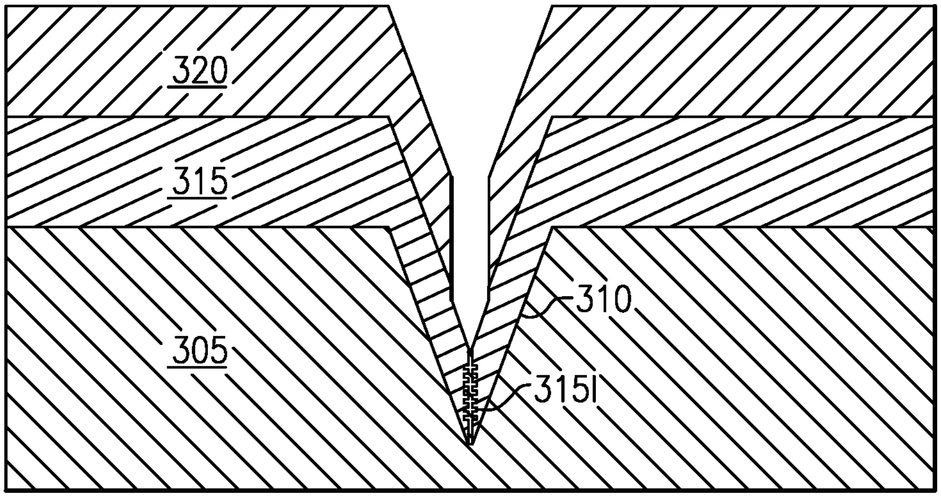
FIG. 9F illustrates another act in a process flow for producing an embodiment of a cantilever piezoelectric MEMS microphone.
Figure 9G:
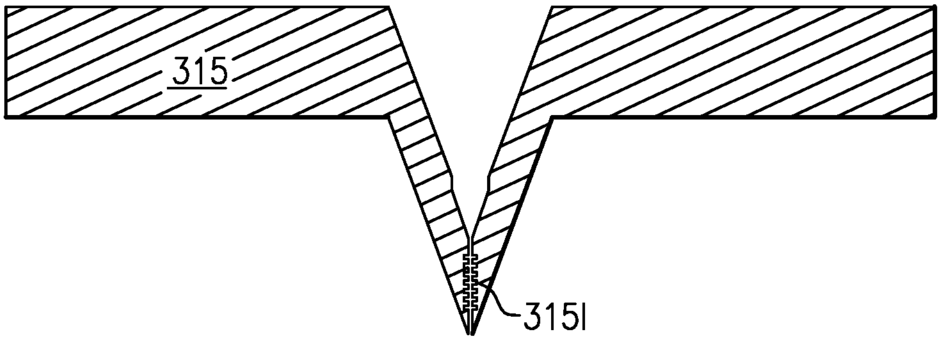
FIG. 9G illustrates another act in a process flow for producing an embodiment of a cantilever piezoelectric MEMS microphone.

In other embodiments, the piezoelectric material 315 may be locally etched to weaken the joint between adjacent edge extensions 205E to facilitate later separation by cracking by application of pressure, or to fully separate the adjacent edge extensions 205E by etching. As illustrated in FIG. 9E, after the piezoelectric material 315 is deposited on the substrate 305 and in the trench 310, a mask layer 320, for example, photoresist may be deposited on the piezoelectric material 315 and patterned to define an opening exposing the piezoelectric material 315 in the center of the trench 310. A wet etch may then be performed that forms or increases the size of voids in an interface region 3151 where the cantilever structures will be later separated to define inner edges of the edge extensions 205E (FIG. 9F). The mask layer 320 is then removed by methods known in the art. When the piezoelectric material 315 is removed from the substrate 305 defects or voids are present in the interface region 3151 that will facilitate later separation of the adjacent cantilevers at the interface region 3151 (FIG. 9G).

Figure 9H:
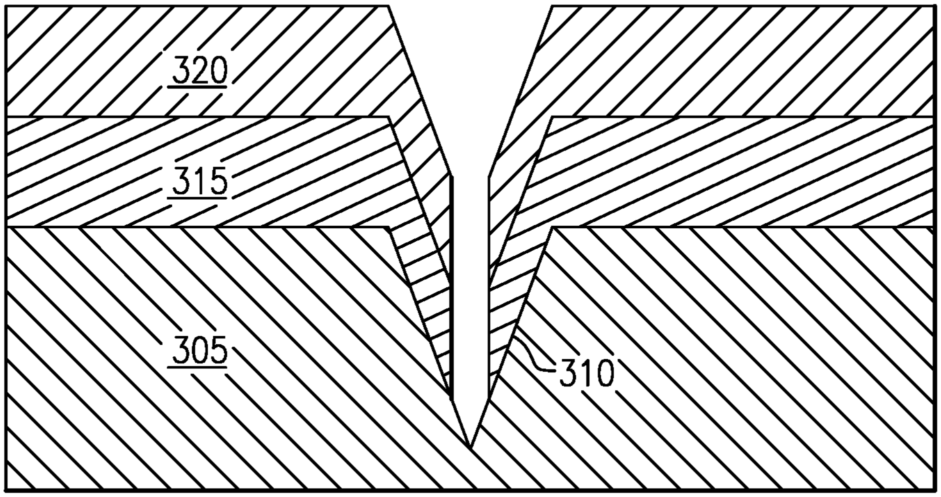
FIG. 9H illustrates another act in a process flow for producing an embodiment of a cantilever piezoelectric MEMS microphone.
Figure 9I:
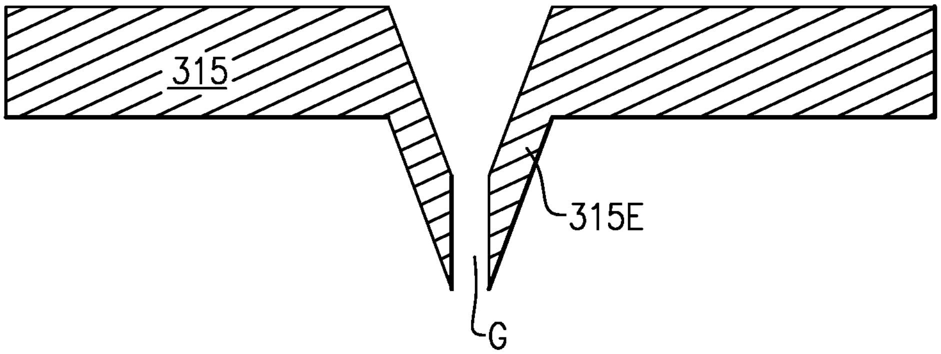
FIG. 9I illustrates another act in a process flow for producing an embodiment of a cantilever piezoelectric MEMS microphone.

As an alternative to utilizing a wet etch, a dry etch may be performed to separate the adjacent cantilevers. As with the wet etch method, a mask layer 320, for example, photoresist may be deposited on the piezoelectric material 315 and patterned to define an opening exposing the piezoelectric material 315 in the center of the trench 310. A dry etch may then be performed to remove the piezoelectric material 315 in the center of the trench 310 exposed by the mask layer 20 (FIG. 9H). When the piezoelectric material 315 is removed from the substrate 305 the gap G between adjacent edge extensions 315E is present.

Figure 11A:
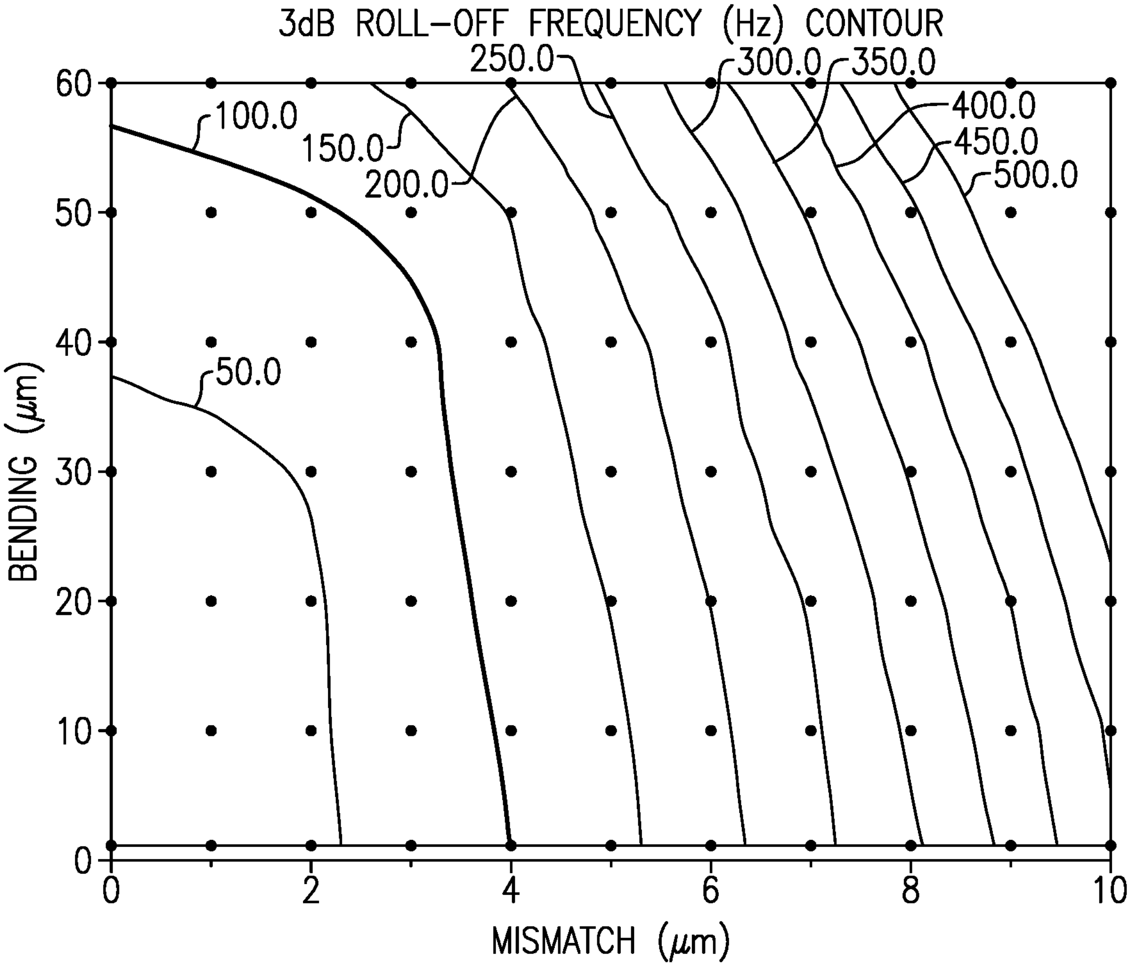
FIG. 11A is a contour plot illustrating 3 dB roll-off as a function of cantilever bending and cantilever static displacement for an embodiment of a cantilever piezoelectric MEMS microphone.
Figure 11B:
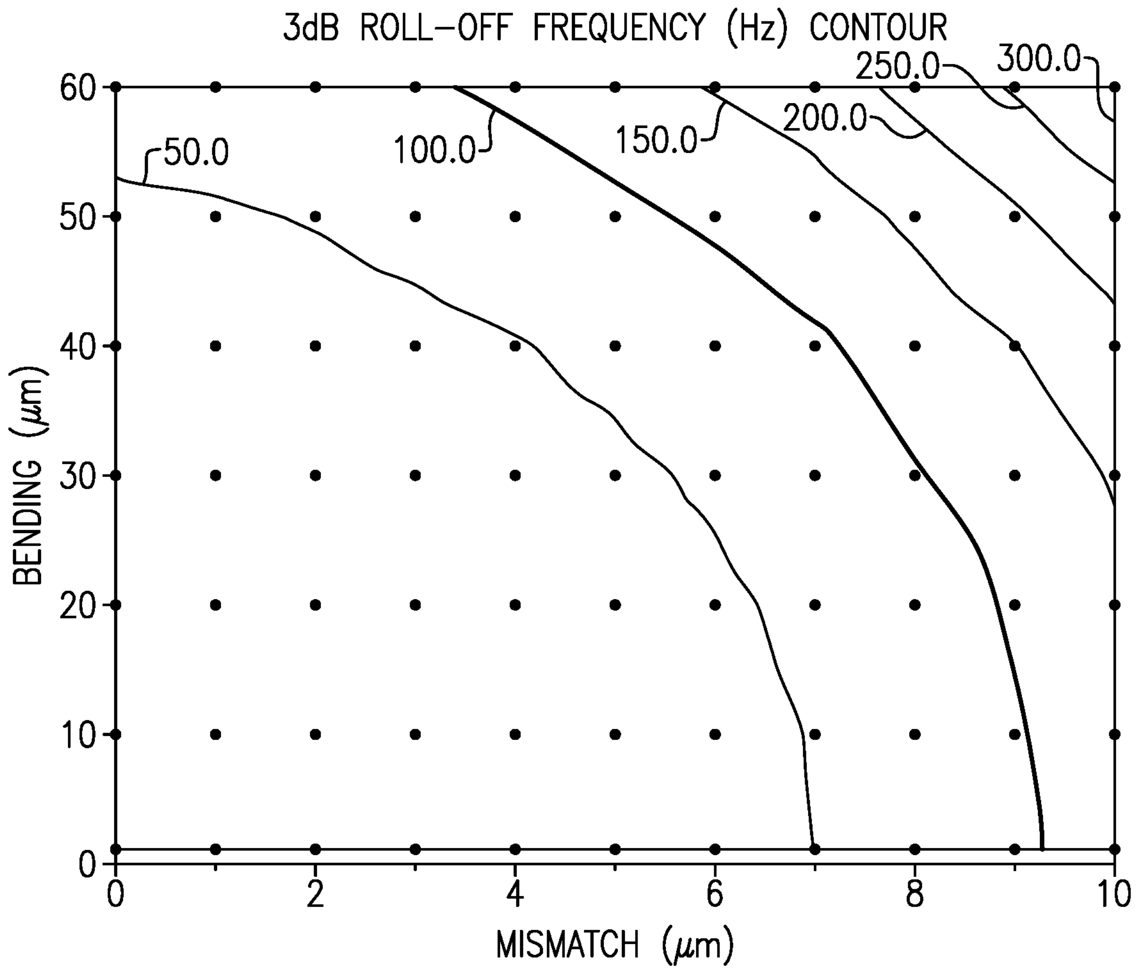
FIG. 11B is a contour plot illustrating 3 dB roll-off as a function of cantilever bending and cantilever static displacement for another embodiment of a cantilever piezoelectric MEMS microphone.

The low frequency performance of a piezoelectric MEMS microphone is restricted by its 3 dB roll-off frequency. For most implementations, it may be desirable that the 3 dB roll-off frequency of a piezoelectric MEMS microphone be below 100 Hz. FIGS. 11A and 11B illustrate the results of simulations of 3 dB roll-off frequency as a function of cantilever bending and cantilever static deflection mismatch for a cantilever piezoelectric MEMS microphone as illustrated in FIGS. 1A-2B without extension (FIG. 11A) and for a cantilever piezoelectric MEMS microphone as illustrated in FIGS. 5-8 with edge extension. From a comparison between FIGS. 11A and 11B it can be seen that with the edge extension structures, the 100 Hz contour line, representing the combination of cantilever bending and static mismatch that results in the 3 dB roll-off frequency being met, moves towards much higher mismatch and bending amounts. The presence of the edge extension thus allows for greater manufacturing process windows to produce cantilever piezoelectric MEMS microphones that have acceptable 3 dB roll-off frequencies. It should be noted that FIGS. 11A and 11B are presented to show the general effect of the addition of edge extension structures to the cantilevers of a cantilever piezoelectric MEMS microphone, but the numerical values shown are not necessarily representative of the performance of any particular piezoelectric MEMS microphone as disclosed herein.

Figure 12:
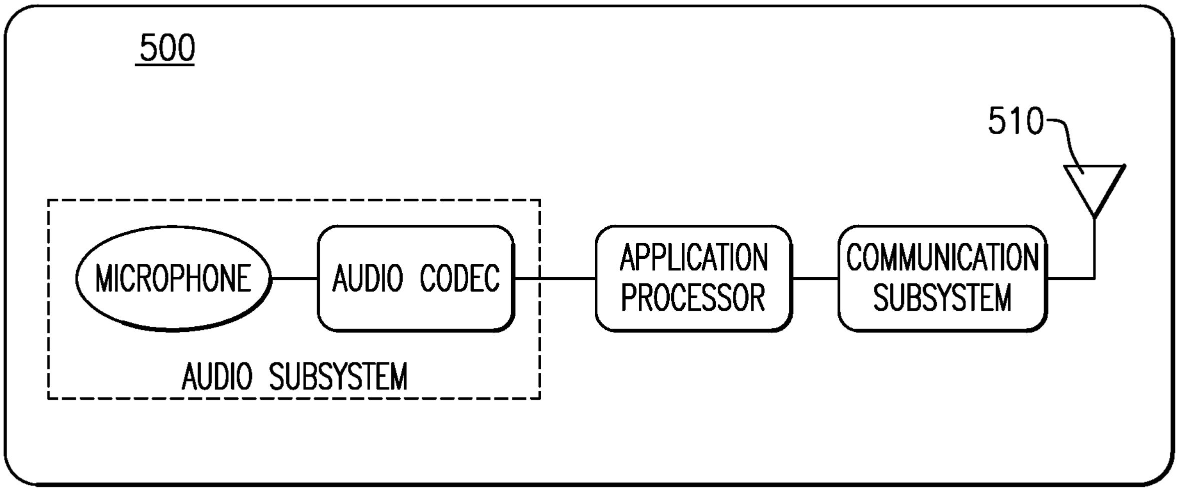
FIG. 12 is a block diagram of one example of a wireless device and that can include one or more piezoelectric MEMS microphones according to aspects of the present disclosure.

Examples of MEMS microphones as disclosed herein can be implemented in a variety of packaged modules and devices. FIG. 12 is a schematic block diagrams of an illustrative device 500 according to certain embodiments.

The wireless device 500 can be a cellular phone, smart phone, tablet, modem, communication network or any other portable or non-portable device configured for voice or data communication. The wireless device 500 can receive and transmit signals from the antenna 510.

The wireless device 500 may include one or more microphones as disclosed herein. The one or more microphones may be included in an audio subsystem including, for example, an audio codec. The audio subsystem may be in electrical communication with an application processor and communication subsystem that is in electrical communication with the antenna 510. As would be recognized to one of skill in the art, the wireless device would typically include a number of other circuit elements and features that are not illustrated, for example, a speaker, an RF transceiver, baseband sub-system, user interface, memory, battery, power management system, and other circuit elements.

The principles and advantages of the embodiments can be used for any systems or apparatus, such as any uplink wireless communication device, that could benefit from any of the embodiments described herein. The teachings herein are applicable to a variety of systems. Although this disclosure includes some example embodiments, the teachings described herein can be applied to a variety of structures. Any of the principles and advantages discussed herein can be implemented in association with RF circuits configured to process signals in a range from about 30 kHz to 10 GHz, such as in the X or Ku 5G frequency bands.

Aspects of this disclosure can be implemented in various electronic devices. Examples of the electronic devices can include, but are not limited to, consumer electronic products, parts of the consumer electronic products such as packaged radio frequency modules, uplink wireless communication devices, wireless communication infrastructure, electronic test equipment, etc. Examples of the electronic devices can include, but are not limited to, a mobile phone such as a smart phone, a wearable computing device such as a smart watch or an ear piece, a telephone, a television, a computer monitor, a computer, a modem, a hand-held computer, a laptop computer, a tablet computer, a microwave, a refrigerator, a vehicular electronics system such as an automotive electronics system, a stereo system, a digital music player, a radio, a camera such as a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While certain embodiments have been described, these embodiments have been presented by way of example only and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A piezoelectric microelectromechanical system microphone comprising:

a frame;

a film of piezoelectric material including slits defining a plurality of independently displaceable piezoelectric elements within an area defined by a perimeter of the frame, bases of the plurality of piezoelectric elements mechanically secured to the frame, tips of the plurality of piezoelectric elements being free to be displaced in a direction perpendicular to a plane defined by the frame responsive to impingement of sound waves on the plurality of piezoelectric elements; and edge extensions extending from edges of the plurality of piezoelectric elements in the direction perpendicular to the plane defined by the frame to reduce a 3 dB roll-off frequency of the piezoelectric microelectromechanical system microphone.

2. The piezoelectric microelectromechanical system microphone of claim 1 wherein the plurality of piezoelectric elements have cantilever structures.

3. The piezoelectric microelectromechanical system microphone of claim 1 having a 3 dB roll-off frequency of 100 Hz or less.

4. The piezoelectric microelectromechanical system microphone of claim 1 wherein at least one of the plurality of piezoelectric elements exhibits a static displacement from a plane defined by an upper surface of the frame.

5. The piezoelectric microelectromechanical system microphone of claim 4 wherein a first of the plurality of piezoelectric elements exhibits a first static deflection, and a second of the plurality of piezoelectric elements exhibits a second static deflection that is different from the first static deflection.

6. The piezoelectric microelectromechanical system microphone of claim 1 wherein the plurality of piezoelectric elements each include an upper film of piezoelectric material having a first average residual stress and a lower film of piezoelectric material having a second average residual stress different from the first average residual stress.

7. The piezoelectric microelectromechanical system microphone of claim 6 wherein the upper film of piezoelectric material has a stress distribution that at least partially cancels a stress distribution in the lower film of piezoelectric material.

8. The piezoelectric microelectromechanical system microphone of claim 6 wherein the plurality of piezoelectric elements exhibit substantially no static deflection.

9. The piezoelectric microelectromechanical system microphone of claim 1 wherein the edge extensions are present on only portions of the edges of each of the plurality of piezoelectric elements.

10. The piezoelectric microelectromechanical system microphone of claim 9 wherein the edge extensions are absent from portions of the edges of each of the plurality of piezoelectric elements in sensing regions proximate the frame.

11. The piezoelectric microelectromechanical system microphone of claim 10 wherein the sensing regions extend from the bases of the plurality of piezoelectric elements inward toward the tips of the plurality of piezoelectric elements.

12. The piezoelectric microelectromechanical system microphone of claim 11 wherein the sensing regions extend from the bases of the plurality of piezoelectric elements inward toward the tips of the plurality of piezoelectric elements by from 20% to 40% of lengths of the edges of the plurality of piezoelectric elements from the bases to the tips.

13. The piezoelectric microelectromechanical system microphone of claim 11 wherein the edge extensions are present within portions of the edges of each of the plurality of piezoelectric elements in mechanical regions extending from inward extents of the sensing regions to the tips of the plurality of piezoelectric elements.

14. The piezoelectric microelectromechanical system microphone of claim 13 wherein gaps between adjacent piezoelectric elements in the mechanical regions are narrower than gaps between adjacent piezoelectric elements in the sensing regions.

15. The piezoelectric microelectromechanical system microphone of claim 1 wherein the plurality of piezoelectric elements are substantially triangular.

16. The piezoelectric microelectromechanical system microphone of claim 1 wherein the edge extensions have lengths that are between 1 μm and 10 μm or between 0.2% and 5% of lengths of the edges of the plurality of piezoelectric elements.

17. The piezoelectric microelectromechanical system microphone of claim 1 wherein the edge extensions descend downward from the edges of the plurality of piezoelectric elements at an angle relative to the direction perpendicular to the plane defined by the frame.

18. The piezoelectric microelectromechanical system microphone of claim 1 wherein the angle is between 30° and 85°.

19. The piezoelectric microelectromechanical system microphone of claim 1 wherein the plurality of piezoelectric elements and the edge extensions are formed of a same material.

20. An electronic device including the piezoelectric microelectromechanical system microphone of claim 1.

* * * * *